United States Patent
Wu et al.

(10) Patent No.: US 8,234,664 B2
(45) Date of Patent: Jul. 31, 2012

(54) EJECTION DEVICE FOR EJECTING AN OPTICAL DISK AND RELATED METHOD

(75) Inventors: Jen-Chen Wu, Taoyuan County (TW); Ko-Han Huang, Taoyuan County (TW)

(73) Assignee: Quanta Storage Inc., Guishan Shiang, Taoyuan County (TW)

( * ) Notice: Subject to any disclaimer, the term of this patent is extended or adjusted under 35 U.S.C. 154(b) by 308 days.

(21) Appl. No.: 12/576,237

(22) Filed: Oct. 8, 2009

(65) Prior Publication Data
US 2010/0162278 A1  Jun. 24, 2010

(30) Foreign Application Priority Data
Dec. 22, 2008  (TW) ................................ 97150175 A (51) Int. Cl.
*G11B 17/04*  (2006.01)
(52) U.S. Cl. ........................................................ 720/623
(58) Field of Classification Search .......... 720/617–623, 720/626
See application file for complete search history.

(56) References Cited

U.S. PATENT DOCUMENTS

| | | | |
|---|---|---|---|
| 5,136,570 A * | 8/1992 | Takai et al. | 720/624 |
| 2005/0198656 A1* | 9/2005 | Yamamoto et al. | 720/616 |
| 2008/0052731 A1* | 2/2008 | Chiou et al. | 720/622 |

* cited by examiner

*Primary Examiner* — Nathan Danielsen
(74) *Attorney, Agent, or Firm* — Winston Hsu; Scott Margo (57) ABSTRACT

The invention provides a method for ejecting an optical disk and a related ejection device for a slot-in disk drive. The ejection device includes a block disposed on a contact end of an unloading bar. The block stretches out of the contact end of the unloading bar along a longitudinal direction of the unloading bar for pushing a small size optical disk so that a distance between a center of the small size optical disk and a contact end of a loading bar exceeds a predetermined distance. When the small size optical disk is unloaded, the unloading bar backs to an initial position, the slot-in disk drive idles to load and unload the small size optical disk continuously for pushing the small size optical disk outwardly further.

9 Claims, 7 Drawing Sheets

EJECTION DEVICE FOR EJECTING AN OPTICAL DISK AND RELATED METHOD

BACKGROUND OF THE INVENTION

1. Field of the Invention

The present invention relates to an ejection device for ejecting an optical disk and a related method, and more particularly, to an ejection device for ejecting a small size optical disk and a related method.

2. Description of the Prior Art

A conventional loading/unloading structure for a slot-in disk drive includes a plurality of bars. When an optical disk is inserted into an opening of the slot-in disk drive, the optical disk is slid in the slot-in disk drive by the loading/unloading device for reading in/out datum on the optical disk. When the optical disk is ejected from the slot-in disk drive, the optical disk is slid out the slot-in disk drive by the loading/unloading device via the opening, so that the optical disk is taken away or changed conveniently.

Figure 1:
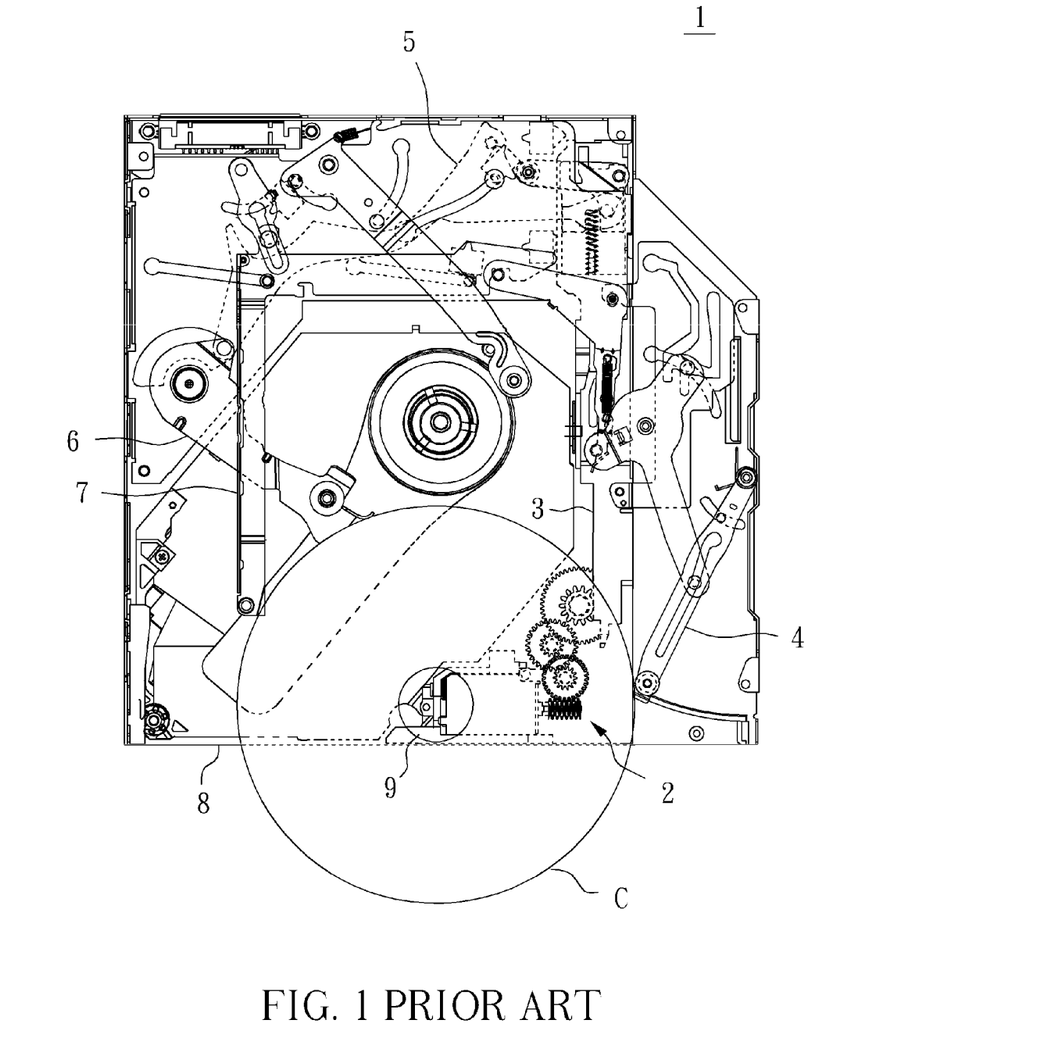
FIG. 1 is a top view of a slot-in disk drive in the prior art.

As shown in FIG. 1, FIG. 1 is a top view of a slot-in disk drive 1 disclosed in Taiwan patent publication no. 200811834 in the prior art. The slot-in disk drive 1 is for loading and unloading a 12 cm optical disk and an 8 cm optical disk. The slot-in disk drive 1 utilizes a driving unit 2 to move a sliding component 3 so as to drive a loading bar 4 for loading a small size optical disk C. The sliding component 3 further drives a linkage mechanism 5 to rotate an unloading bar 6 for pushing the small size optical disk C outward, so that the small size optical disk is ejected from the slot-in disk drive 1 along the loading bar 7 and is exposed out of an opening 8 partly for being taken away or changed.

However, the slot-in disk drive 1 is mainly for loading and unloading the 12 cm optical disk. When the small size optical disk C, such as an 8 cm optical disk, is ejected from the slot-in disk drive 1, only small part of the small size optical disk is exposed out of the opening 8, which means most part of the small size optical disk C is located inside the slot-in disk drive 1. Most important of all, a central hole 9 of the small size optical disk C is not exposed out of the opening 8 so that the small size optical disk C is taken away inconveniently. Thus, design of an ejection device for ejecting the optical disk conveniently is an important issue in the computer industry.

SUMMARY OF THE INVENTION

An objective of the present invention is to provide an ejection device for solving above drawbacks. The ejection device includes a block disposed on an unloading bar so as to push a small size optical disk outward further. A distance between a center of the small size optical disk and a contact end of a loading bar exceeding a predetermined distance helps the contact end of the loading bar to push the small size optical disk outward further.

Another objective of the present invention is to provide a method for ejecting the small size optical disk includes pushing the center of the small size optical disk to exceed the contact end of the loading bar over the predetermined distance, and the slot-in disk drive idling to load and unload the small size optical disk continuously for driving the loading bar to push the small size optical disk outward further.

In order to achieve the foregoing objectives of the invention, the block is disposed on the contact end of the unloading bar. The block stretches out of the contact end of the unloading bar along a longitudinal direction of the unloading bar, so that the distance between the center of the small size optical disk and the contact end of the loading bar exceeds the predetermined distance after the small size optical disk is pushed outward by the unloading bar.

According to the claimed invention, the method for ejecting the optical disk out of the slot-in disk drive includes starting an unloading process, detecting whether the ejecting unloaded optical disk is the small size optical disk, backing the unloading bar to an initial position, ejecting the small size optical disk mainly, pushing the center of the small size optical disk outward the predetermined distance, and idling to load and unload continuously so as to push the small size optical disk outward further.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
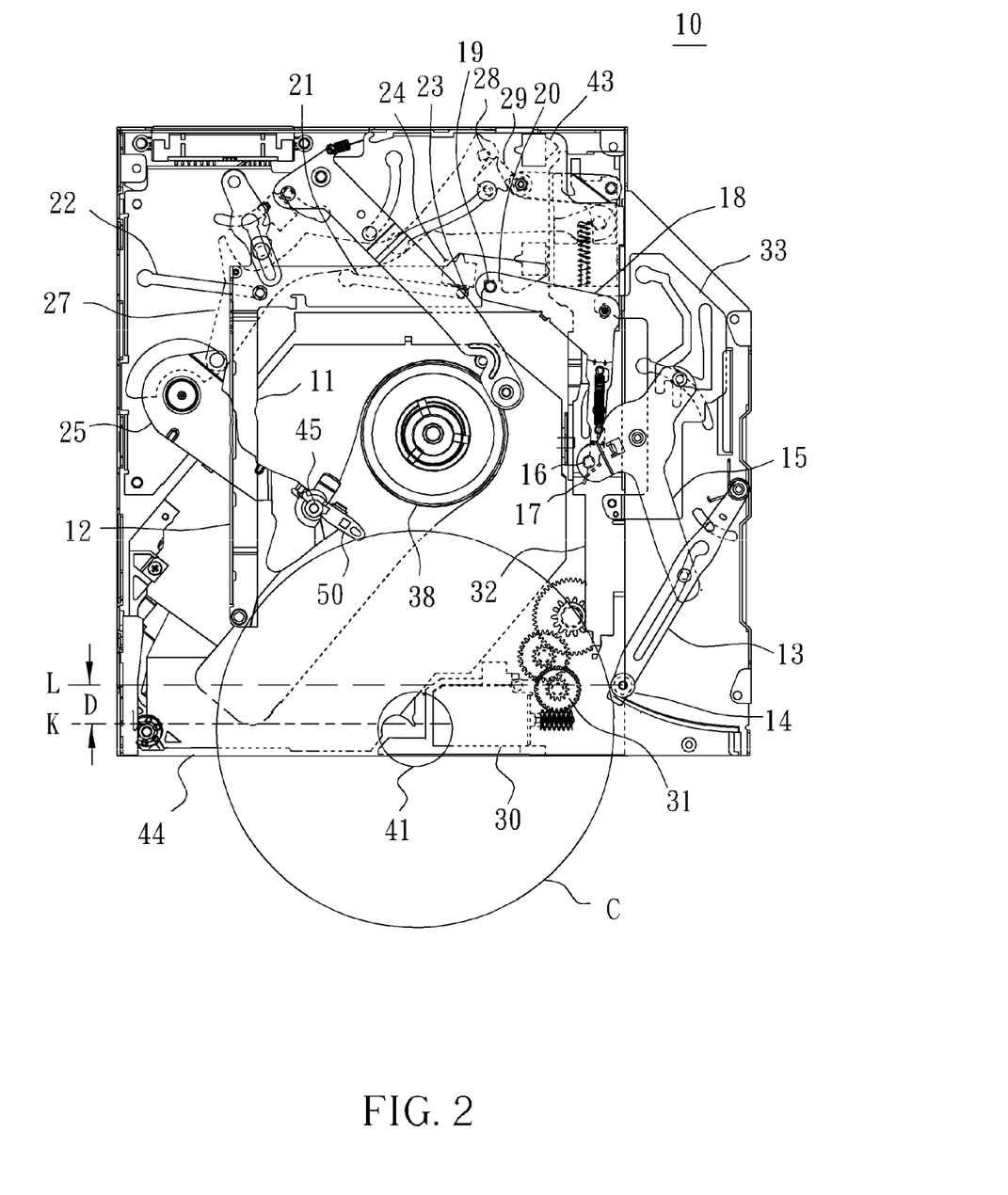
FIG. 2, FIG. 3, and FIG. 4 are top views of different states of an ejection device of a slot-in disk drive according to a preferred embodiment of the present invention.
Figure 3:
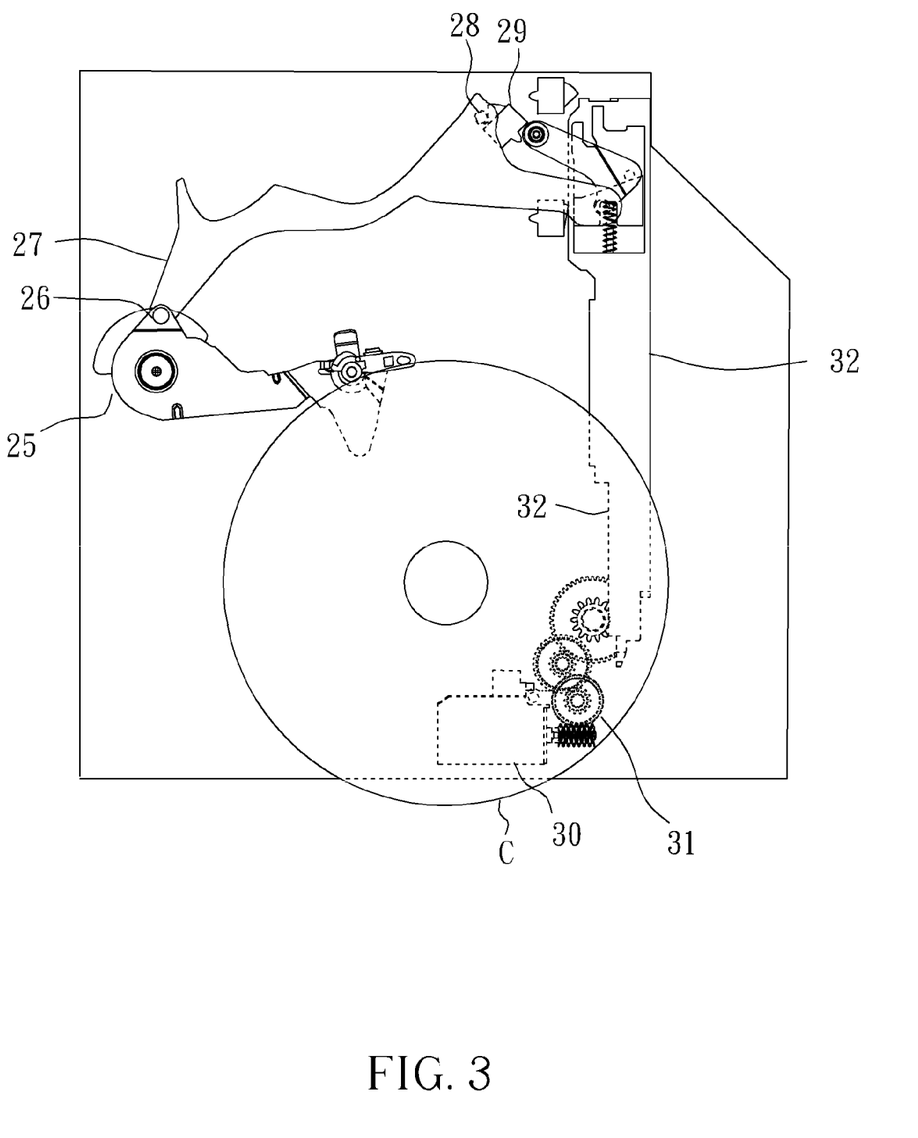
Figure 4:
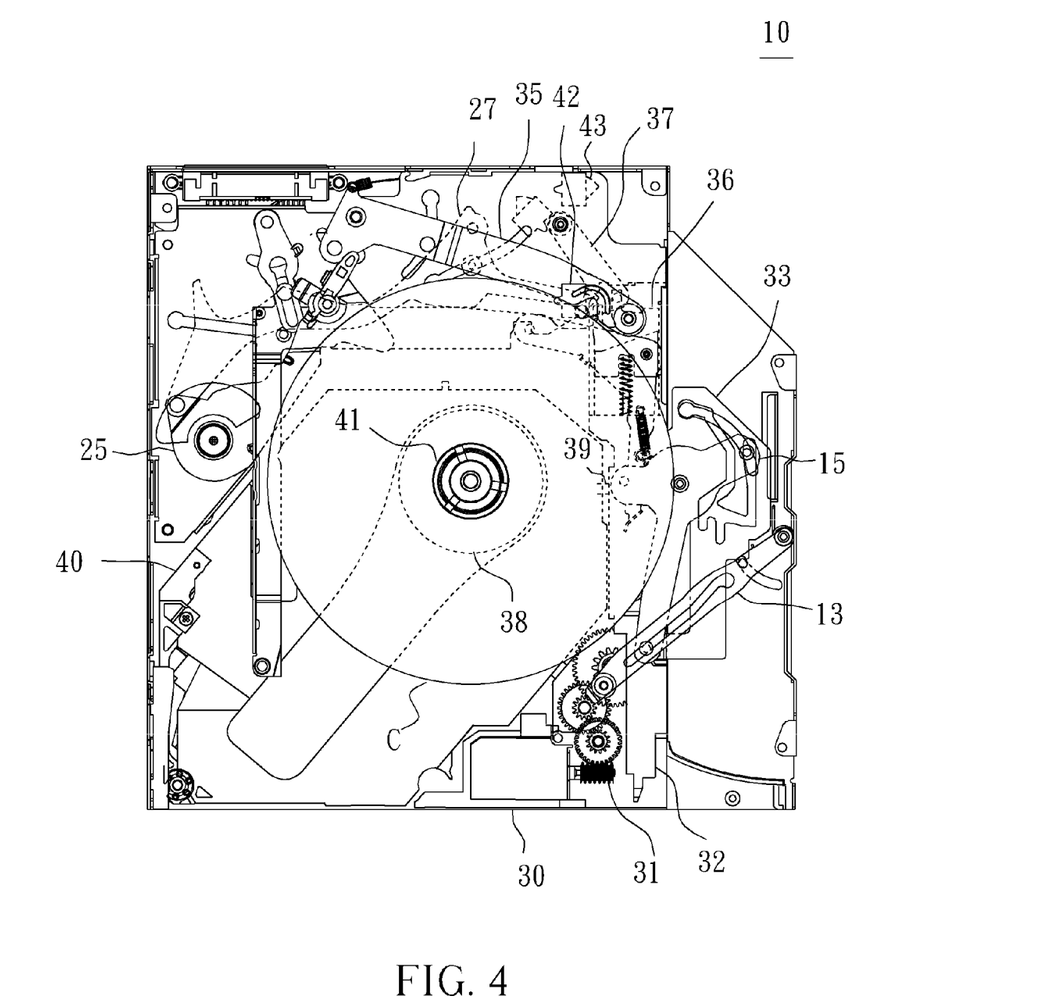

Please refer to FIG. 2, FIG. 3, and FIG. 4. FIG. 2, FIG. 3, and FIG. 4 are top views of different states of an ejection device of a slot-in disk drive 10 according to a preferred embodiment of the present invention. A loading/unloading mechanism of the slot-in disk drive 10 for loading and unloading a normal size optical disk and a small size optical disk and a related method are disclosed in the prior art, and the features of the conventional skill are omitted herein for simplicity. Following is the related loading and unloading process of an small size optical disk C of the present invention. As shown in FIG. 2, when the small size optical disk C is inserted into the slot-in disk drive 10, an end of the small size optical disk C is pushed to move along an edge 12 of a contacting bar 11 so as to enter into the slot-in disk drive 10. Because a distance between the edge 12 and a loading bar 13 is a little smaller than a diameter of the small size optical disk C, the small size optical disk C slightly pushes a contact end 14 of the loading bar 13 laterally, and a driving bar 15 can not be rotated for driving a guiding pin 16 to contact an edge 17 so as to rotate a locking component 18 effectively. Therefore, a buckling pin 19 is engaged inside a buckled slot 20, so that the contacting bar 11 can not move along a first inclined slot 21 and a second inclined slot 22 laterally. Meanwhile, a first pin 23 of the contacting bar 11 can not depart from a first sensor 24, and the first sensor 24 is at ON state.

As shown in FIG. 3, when the small size optical disk C is inserted into the slot-in disk drive 10 continuously, an end of the small size optical disk C pushes an unloading bar 25 to move backward and to rotate. The unloading bar 25 moves a first linkage 27 via a fixing pin 26, so that a second pin 28 of the first linkage 27 departs from a second sensor 29, and the second sensor 29 is at OFF state. Therefore, the slot-in disk drive 10 detects the optical disk being the small size optical disk C and drives a driving motor 30 to rotate a gear set 31 so as to drive a sliding component 32 to move forward.

As shown in FIG. 4, a sliding plate 33 fixed on the sliding component 32 moves forward. A guiding slot 34 formed on the sliding plate 33 rotates the driving bar 15 to drive the loading bar 13 to load the small size optical disk C. The optical disk C moves backward continuously and pushes the unloading bar 25 and a positioning bar 35. At this time, the sliding component 32 drives a second linkage 37 via a sliding slot 36, so as to move the first linkage 27 to rotate the unloading bar 25 backward. Then, the positioning bar 35 guides the small size optical disk C to move backward and to align with a spindle motor 38, so as to position the optical disk C accurately. After that, the sliding component 32 drives a sliding pin 39 to move a traverse 40 upward so as to engage a central hole 41 of the small size optical disk C with the spindle motor 38. The sliding component 32 continuously moves the loading bar 13, the unloading bar 25, and the positioning bar 35 to depart from the small size optical disk C until a rear end of the sliding component 32 departs from a third sensor 42 and the third sensor 42 is at OFF state so that the driving motor 30 is shut off and the optical disk C is positioned completely.

The unloading process of the slot-in disk drive 10 is contrary to the loading process mentioned above. First, the driving motor 30 drives the gear set 31 to move the sliding component 32 backward. The sliding component 32 moving backward drives the sliding plate 33 to rotate the driving bar 15, so as to move the loading bar 13 outward. The sliding component 32 further drives the second linkage 37 via the sliding slot 36, so as to move the first linkage 27 to rotate the unloading bar 25 forward to eject the optical disk C from the slot-in disk drive 10. The rear end of the sliding component 32 contacts the third sensor 42, and the third sensor 42 is at ON state. Then, the sliding component 32 moves backward to drive the second linkage 37 via the sliding slot 36, so as to move the first linkage 27 to rotate the unloading bar 25 forward. As shown in FIG. 2, the second pin 28 of the first linkage 27 contacts the second sensor 29 again, and the second sensor 29 is at OFF state. Therefore, the unloading bar 25 driven by the sliding component 32 can push the optical disk C out of an opening 44 partly.

The ejection device of the present invention includes a block 50 disposed on a contact end 45 of the unloading bar 25. The block 50 stretches out of the contact end 45, which means the block 50 can stretch out of the contact end 45 along a longitudinal direction of the unloading bar 25 to push the small size optical disk C outward further. Due to a dimension of the block 50 limited to an inner space of the slot-in disk drive 10, and for preventing the unloading bar 25 from failing to guide the optical disk C to align with the spindle motor 38 automatically by the block 50 easily, the block 50 can not have enough length to push the small size optical disk C out of the opening 44 over a suitable distance. The preferred length of the block 50 is for ensuring a distance between a center of the small size optical disk C (line K shown in FIG. 2) and the contact end 14 of the loading bar 13 (line L shown in FIG. 2) capable of exceeding a predetermined distance D when the second pin 28 of the first linkage 27 contacts the second sensor 29 again, the second sensor 29 is at OFF state, and the unloading bar 25 backs to an initial position. In this embodiment, the distance D is larger than a radius of the central hole 41. The distance D is at least larger than half the radius of the central hole 41 so as to prevent the point where the contact end 14 contacts the small size optical disk C from being close to a central line of the optical disk C and to prevent the optical disk C from being failed to load once.

Figure 5:
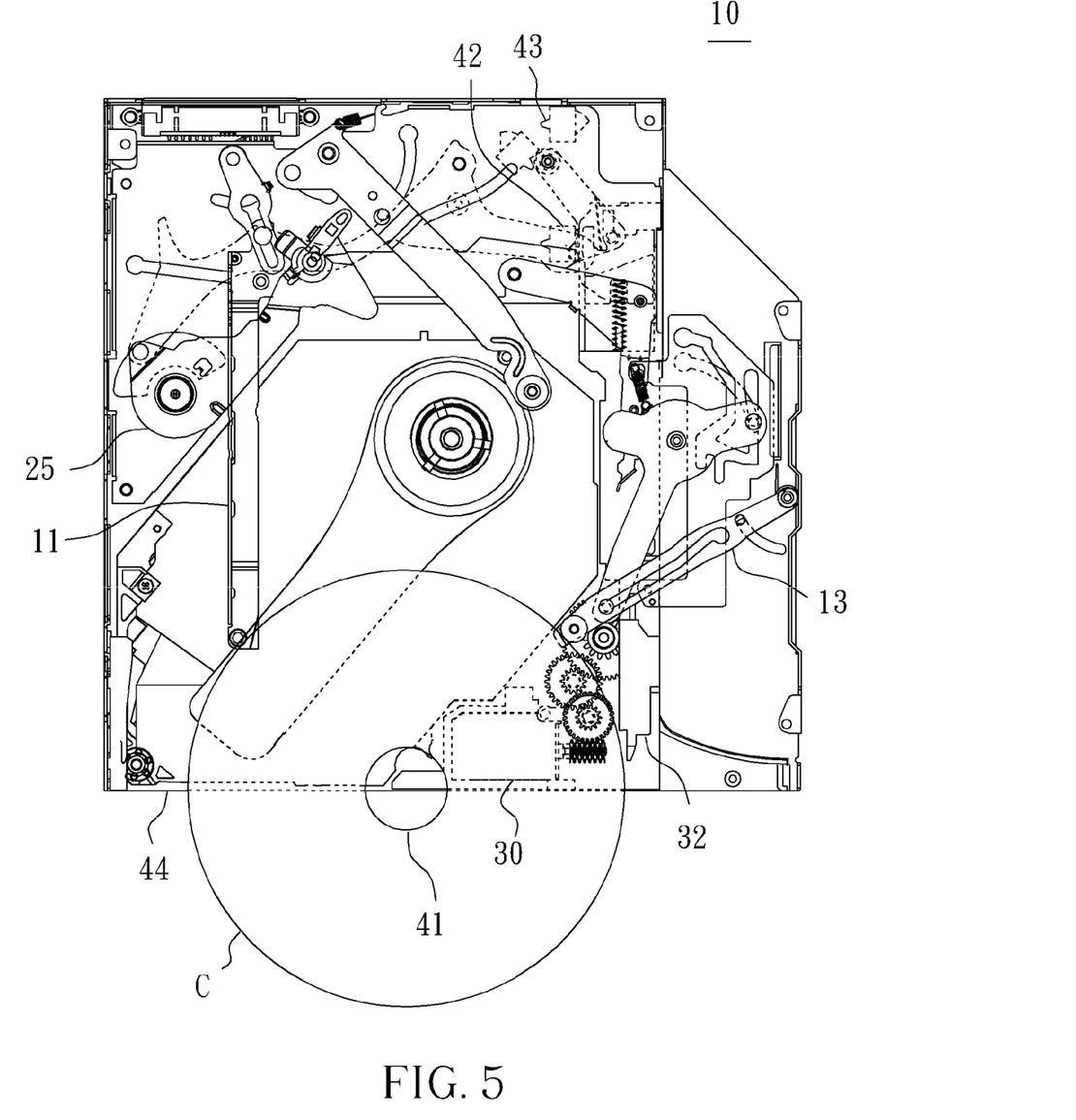
FIG. 5 is a top view of the slot-in disk drive idling to load and unload continuously according to the preferred embodiment of the present invention.

In the unloading process, when the second sensor 29 is at OFF state, and the unloading bar 25 backs to the initial position, because the optical disk C is detected as the small size optical disk C, the driving motor 30 drives the sliding component 32 forward inside the slot-in disk drive 10. The sliding component 32 drives the sliding plate 33 to rotate the driving bar 15, so as to drive the loading bar 13 to load the small size optical disk C. Because the distance between the center of the optical disk C and the contact end 14 of the loading bar 13 exceeds the predetermined distance D, the loading bar 13 can not load the optical disk C and pushes the small size optical disk C to move outward instead. Please refer to FIG. 5, FIG. 5 is a top view of the slot-in disk drive 10 idling to load and unload continuously according to the preferred embodiment of the present invention. The sliding component 32 moves forward to depart from the third sensor 42 and to drive the loading bar 13 and the unloading bar 25 to move in a loading direction, which is the same as the loading process mentioned above. The slot-in disk drive 10 idles to load and unload continuously so that the loading bar 13 pushes the rear end of the small size optical disk C. Therefore, the small size optical disk C is ejected out of the slot-in disk drive 10 by the loading bar 13 and the contacting bar 11, and the central hole 41 of the small size optical disk C is exposed out of the opening 44 partly.

Figure 6:
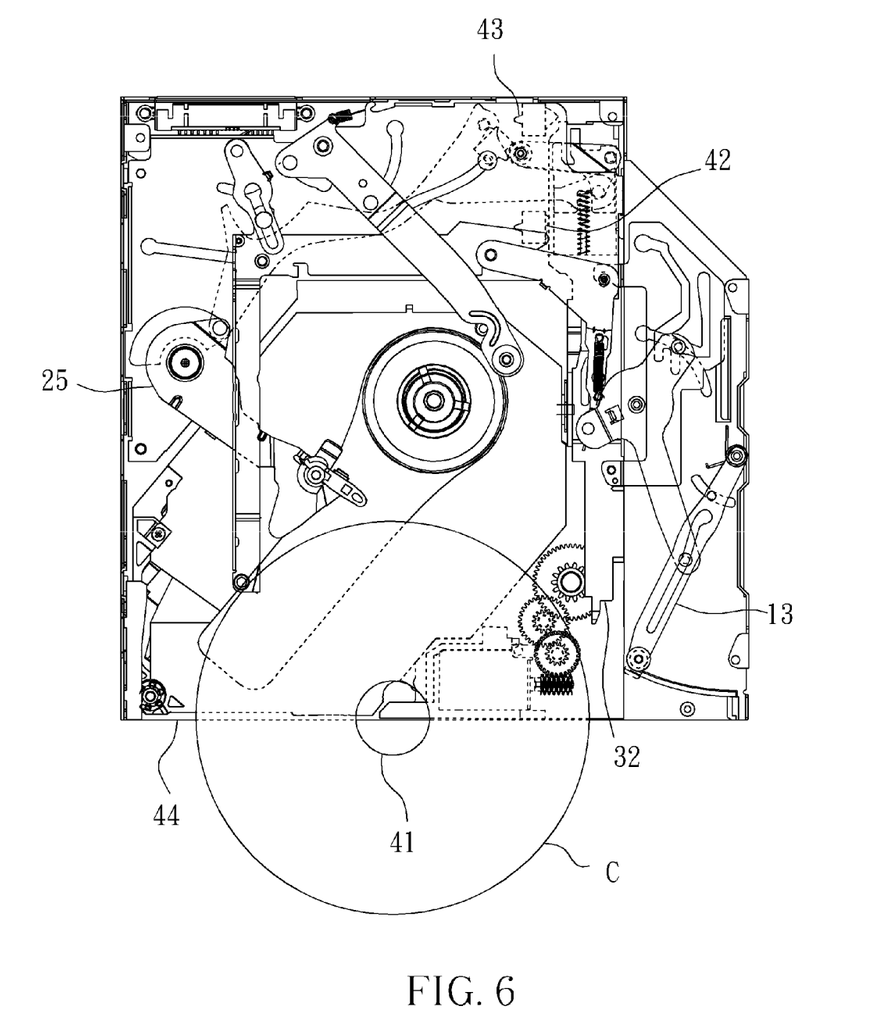
FIG. 6 is a top view of an optical disk being ejected from the slot-in disk drive according to the preferred embodiment of the present invention.

As shown in FIG. 6, FIG. 6 is a top view of the small size optical disk C being ejected from the slot-in disk drive 10 according to the preferred embodiment of the present invention. After the sliding component 32 moves forward to depart from the third sensor 42, the driving motor 30 drives the sliding component 32 backward, which is the same as the unloading process mentioned above, so as to drive the loading bar 13 and the unloading bar 25 to idle continuously. When the rear end of the sliding component 32 contacts a fourth sensor 43, the driving motor 30 drives the sliding component 32 forward so as to depart from the fourth sensor 43. Then, the driving motor 30 is shut off to complete the unloading process. At this time, the loading bar 13 and the unloading bar 25 can not contact the small size optical disk C. The central hole 41 of the small size optical disk C is exposed out of the opening 44 partly so that the small size optical disk C can be taken away conveniently.

Figure 7:
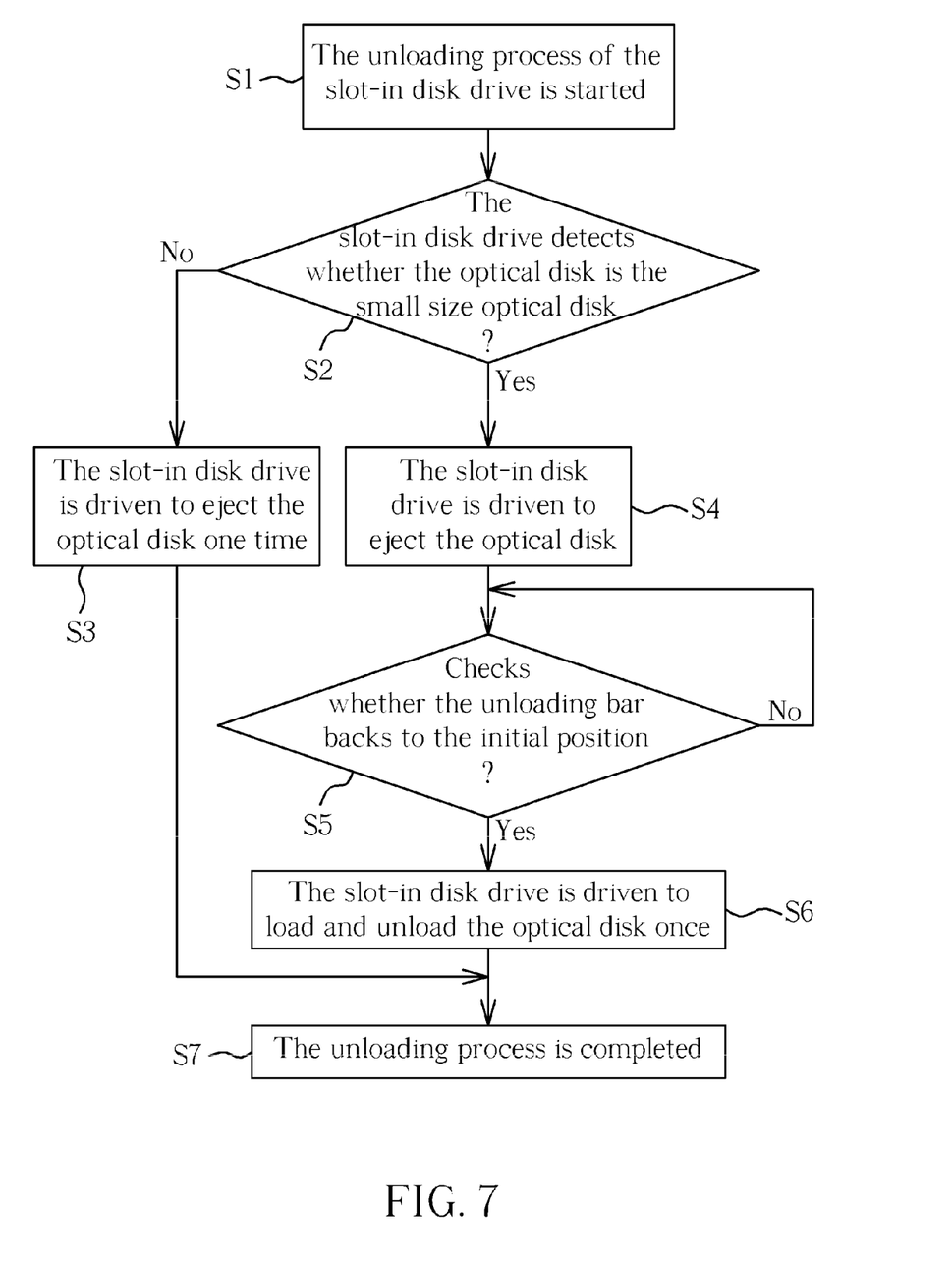
FIG. 7 is a flowchart of ejecting the optical disk according to the preferred embodiment of the present invention.

As shown in FIG. 7, FIG. 7 is a flowchart of ejecting the small size optical disk C according to the preferred embodiment of the present invention. First, in step S1, the unloading process of the slot-in disk drive 10 is started. Then, in step S2, the slot-in disk drive 10 detects whether the optical disk is the small size optical disk. When the optical disk is not the small size optical disk, the slot-in disk drive 10 is driven to eject the optical disk one time in step S3 and the unloading process is completed in step S7. In the contrary, when the optical disk is the small size optical disk C, the slot-in disk drive 10 is driven to eject the small size optical disk C in step S4 and checks whether the unloading bar 25 backs to the initial position in step S5. After the unloading bar 25 backs to the initial position, the slot-in disk drive 10 is driven to load and unload the small size optical disk C once in step S6 and the unloading process is completed in step S7.

Comparing to the prior art, the ejection device of the present invention includes the block disposed on the unloading bar for pushing the small size optical disk outward further, so that the distance between the center of the optical disk and the contact end of the loading bar exceeds the predetermined distance. Therefore, the contact end of the loading bar can move the small size optical disk easily without constraint. The method for ejecting the optical disk out of the slot-in disk drive of the present invention executes the unloading process, the loading process, and the unloading process sequentially when the small size optical disk is ejected. The slot-in disk drive idles to load and unload the optical disk continuously when the small size optical disk is ejected from the slot-in disk drive over the predetermined distance mainly and the loading bar moves the small size optical disk without constraint, and the loading bar is driven to push the small size optical disk outward once, so that the central hole of the small size optical disk can be exposed out of the opening of the slot-in disk drive partly. Therefore, the ejection device of the present invention can eject the small size optical disk, which is taken away conveniently, from the slot-in disk drive.

Those skilled in the art will readily observe that numerous modifications and alterations of the device and method may be made while retaining the teachings of the invention.

What is claimed is:

1. An ejection device for a slot-in disk drive, the slot-in disk drive comprising a driving motor for rotating a gear set, the ejection device comprising:
   a sliding component, the sliding component driven by the gear set moving forward and backward inside the slot-in disk drive;
   a loading bar driven by the sliding component for pushing an optical disk;
   an unloading bar, driven by the sliding component for pushing the optical disk with the loading bar; and
   a block disposed on a contact end of the unloading bar for pushing the optical disk so that a distance between a center of a small size optical disk and a contact end of the loading bar exceeds a predetermined distance being over half a radius of a central hole of the small size optical disk when the unloading bar pushes the small size optical disk outwardly;
   wherein the slot-in disk drive loads and unloads the optical disk once so as to drive the loading bar to push the small size optical disk further outward after the unloading bar backs to an initial position.

2. The ejection device of claim 1, wherein the block extends out of the contact end of the unloading bar.

3. The ejection device of claim 2, wherein the block extends out of the contact end of the unloading bar along a longitudinal direction of the unloading bar.

4. The ejection device of claim 1, wherein the predetermined distance is longer than the radius of the central hole of the small size optical disk.

5. The ejection device of claim 1, wherein the central hole of the small size optical disk is partly exposed out of the slot-in disk drive.

6. A method for ejecting an optical disk out of a slot-in disk drive, comprising:
   starting an unloading process;
   detecting whether the unloaded optical disk is a small size optical disk;
   executing the corresponding unloading process according to a result of detecting whether the unloaded optical disk is the small size optical disk;
   unloading the optical disk and driving an unloading bar of the slot-in disk drive back to an initial position when the unloaded optical disk is the small size optical disk;
   the slot-in disk drive loading and unloading the optical disk once so as to drive the loading bar to push the small size optical disk further outward after the unloading bar backs to the initial position; and
   completing the unloading process.

7. The method of claim 6 further comprising:
   unloading the optical disk once when the unloaded optical disk is not the small size optical disk; and
   completing the unloading process.

8. The method of claim 6, wherein unloading the optical disk and driving the unloading bar back to the initial position comprises unloading the small size optical disk by the loading bar when the unloading bar backs to the initial position.

9. The method of claim 6, wherein unloading the optical disk and driving the unloading bar of the slot-in disk drive back to the initial position comprises pushing a center of the small size optical disk outwardly in a predetermined distance.

* * * * *